Oct. 3, 1961        J. V. FEDOR ET AL        3,002,453
ANTI-RICOCHET DEVICE
Filed Dec. 30, 1958

INVENTORS.
J. V. FEDOR
H. E. EVANS

BY
ATTORNEYS.

United States Patent Office 3,002,453
Patented Oct. 3, 1961

3,002,453
ANTI-RICOCHET DEVICE
Joseph V. Fedor, Takoma Park, and Harold E. Evans, Beltsville, Md., assignors to the United States of America as represented by the Secretary of the Navy
Filed Dec. 30, 1958, Ser. No. 784,003
4 Claims. (Cl. 102—2)
(Granted under Title 35, U.S. Code (1952), sec. 266)

The invention described herein may be manufactured and used by or for the Government of the United States of America for governmental purposes without the payment of any royalties thereon or therefor.

This invention relates to a bomb or missile and more particularly to a nose configuration for an air dropped weapon for reducing the impact shock and the ricochet distance.

In the past, impact shock and ricochet of air dropped missiles were held down mainly by using parachute retardation. By relying solely on such a method the delivering aircraft was forced to fly at relatively high altitudes to insure maximum parachute effectiveness. This rendered the aircraft highly vulnerable to enemy fire.

A primary object of the invention is to provide a missile nose of such unique configuration that impact shock and ricochet is minimized.

Another object is to take advantage of the properties of the target to aid impact mitigation.

A further object of the invention is to provide a new nose configuration such that parachute retardation is no longer necessary and hence the missile can be launched from altitudes lower than heretofore without incurring excessive ricochet or shock.

An additional object is to provide a new and improved missile of reduced cost and weight.

Other objects and many of the attendant advantages of this invention will be readily appreciated as the same becomes better understood by reference to the following detailed description when considered in connection with the accompanying drawing wherein.

Figure 1:
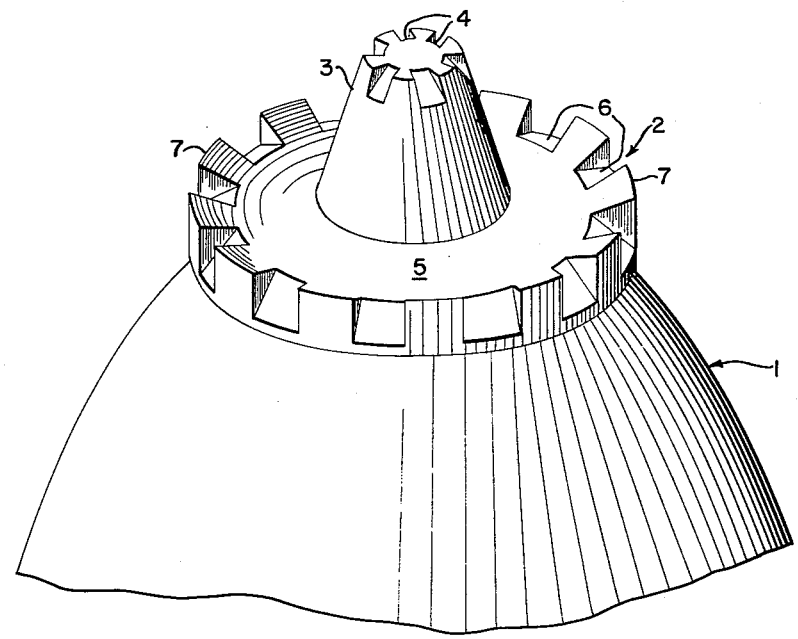
FIG. 1 is a perspective view of one arrangement of the present invention.

Referring now to the accompanying drawing wherein like reference characters indicate similar or identical parts throughout the several views, and more particularly to FIG. 1, which represents a perspective of a portion of the bomb with the unique nose attached thereto, the numeral 1 indicates generally the body of the missile and 2 indicates the new nose thereof. In carrying out the invention the nose is made of two configurations. The upper, as oriented in the drawing, or forward portion 3 is the shape of a frustum of a cone, the uppermost end being serrated or grooved to form a plurality of equal spaces 4 around the periphery thereof, forming a spike. The lower part of the spike or cone 3 terminates in a dish shaped portion 5. A plurality of grooves 6 are provided on the periphery of the portion 5 forming a serrated periphery or plurality of spikes 7 which describe a "cookie cutter" configuration. The lower portion of the nose may be provided with external threads and the bomb or missile may be provided with internal threads for mounting the nose in fixed engagement therewith.

Figure 2:
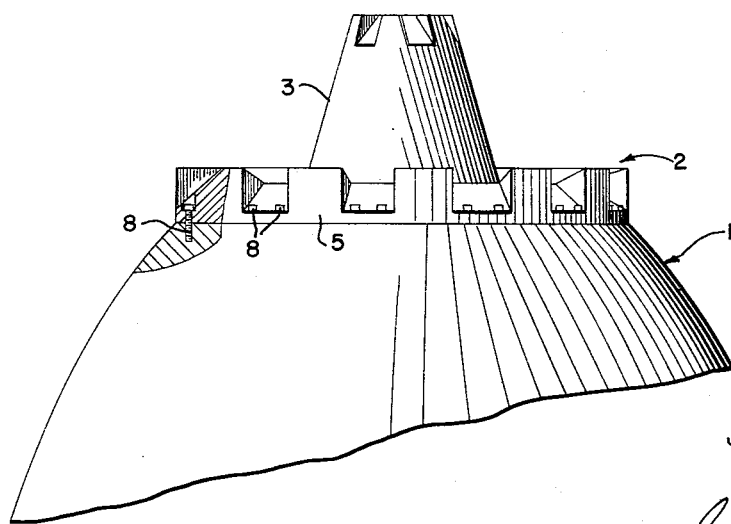
FIG. 2 is a front view of an alternative arrangement of the present invention.

FIG. 2 is a front view of a portion of the missile showing an alternative manner in which the nose may be secured thereto. Bolts 8 may be provided around the lower portion 5 of the nose 2 which are threaded into the forward end of the bomb 1.

The unique nose configuration of the instant invention is designed primarily for concrete targets, although not limited thereto, such as aircraft runways. At near normal impacts the spike 3 strikes the target and produces stress or pressure waves. These stresses tend to break up the target so that the nose can penetrate relatively easily and bring the missile to a gradual stop by penetrating the soil beneath the target.

At shallow angles of impact the serrated periphery or "cookie cutter" portion 7 of the nose digs into the target and tends to bring the cone or spike more against the target. Furthermore, by digging or broaching into the target the unique nose helps to effectively transfer the missile's kinetic energy to the target.

As will be apparent to those skilled in the art this unique nose design removes the altitude restriction on delivery tactics. Full scale tests have demonstrated that the missile can be successfully launched or dropped from altitudes less than one hundred feet. This factor enhances the probability of pilot and plane survival. Furthermore, this invention takes advantage of the properties of the target, i.e., low tensile strength of concrete, for impact mitigation. Former methods carry the mitigating system with the missile and hence increase the cost and weight of the missile.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination with an air dropped missile, a nose member comprising a dished portion and secured to the forward end of the missile with the dished portion forwardly projecting therefrom, a spike formed integrally with said dished portion and extending forwardly thereof, said spike being of frusto-conical configuration and having a smooth outer surface throughout the length thereof and a flat surface on the forward end thereof, a plurality of uniformly spaced serrations each intersecting said outer and flat surfaces thereby to define a plurality of spike elements for producing waves of stress in a target as the target is struck thereby.

2. The combination as defined in claim 1 wherein the base of the frusto-conical spike terminates in and is of smaller diameter than said dished portion.

3. The combination as defined in claim 1 wherein the outer peripheral surface of said dished portion is cylindrical in configuration.

4. The combination as defined in claim 3 wherein the dished portion includes a plurality of uniformly spaced serrations each intersecting the dished and outer peripheral surfaces and defining a plurality of sharp spike-like elements for engaging and entering a target composed of low tensile strength material when the target is struck thereby at a shallow angle of impact.

References Cited in the file of this patent
UNITED STATES PATENTS

| | | |
|---|---|---|
| 43,835 | Converse | Aug. 16, 1864 |
| 1,394,335 | Nichols | Oct. 18, 1921 |
| 2,342,006 | Moore | Feb. 16, 1944 |

FOREIGN PATENTS

| | | |
|---|---|---|
| 128,248 | Great Britain | June 26, 1919 |